United States Patent
Kaneko

(10) Patent No.: US 12,247,645 B2
(45) Date of Patent: Mar. 11, 2025

(54) PLANETARY GEAR DEVICE AND ACTUATOR

(71) Applicant: Enplas Corporation, Saitama (JP)

(72) Inventor: Takuya Kaneko, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 18/274,221

(22) PCT Filed: Jan. 29, 2021

(86) PCT No.: PCT/JP2021/003261
§ 371 (c)(1),
(2) Date: Jul. 26, 2023

(87) PCT Pub. No.: WO2022/162872
PCT Pub. Date: Aug. 4, 2022

(65) Prior Publication Data
US 2024/0125375 A1    Apr. 18, 2024

(51) Int. Cl.
*F16H 1/46* (2006.01)
*F16H 19/08* (2006.01)
*F16H 57/08* (2006.01)

(52) U.S. Cl.
CPC .............. *F16H 19/08* (2013.01); *F16H 1/46* (2013.01); *F16H 57/08* (2013.01)

(58) Field of Classification Search
CPC ................. F16H 1/36–48; F16H 57/08; F16H 1/26–2001/2872
See application file for complete search history.

(56) References Cited

U.S. PATENT DOCUMENTS

| | | | |
|---|---|---|---|
| 4,901,602 A * | 2/1990 | Matoba ...................... | F16H 1/36 475/345 |
| 2001/0008860 A1* | 7/2001 | Niimi .................. | F16H 55/0873 475/345 |
| 2015/0105207 A1* | 4/2015 | Hagedorn ........... | F16H 57/0018 475/149 |
| 2024/0225365 A1* | 7/2024 | Chupka ................. | A47J 43/082 |

FOREIGN PATENT DOCUMENTS

| | | | | |
|---|---|---|---|---|
| EP | 1396660 A2 * | 3/2004 | ........... | F16H 1/2836 |
| JP | 06-74835 | 3/1994 | | |
| JP | H0874947 A * | 3/1996 | ............... | F16H 1/46 |
| JP | 2002-242998 | 8/2002 | | |
| JP | 2018-066454 | 4/2018 | | |

OTHER PUBLICATIONS

International Search Report and the Written Opinion Dated Mar. 23, 2021 From the International Searching Authority Re. Application No. PCT/JP2021/003261 and Its Translation of Search Report Into English. (8 Pages).

* cited by examiner

*Primary Examiner* — Ernesto A Suarez
*Assistant Examiner* — Lillian T Nguyen

(57) ABSTRACT

This planetary gear mechanism comprises a plurality of planetary gears having planetary teeth sections on the outer peripheral surfaces, and an internally toothed gear which is provided so as to surround the plurality of planetary gears and the inner peripheral side of which has an internal teeth section that meshes with the planetary teeth sections, the internally toothed gear having a sliding section that slides against the end surfaces of the planetary gears on one side in the axial direction.

7 Claims, 3 Drawing Sheets

PLANETARY GEAR DEVICE AND ACTUATOR

TECHNICAL FIELD

The present invention relates to a planetary gear apparatus and an actuator.

BACKGROUND ART

A planetary gear apparatus, as a speed reducer that reduces a speed of input rotation and outputs speed-reduced rotation, is used in various mechanical apparatuses such as automobiles and robots (see PTL 1).

A planetary gear apparatus that reduces a speed of rotation of a motor and transmits speed-reduced rotation to an output shaft is disclosed in PTL 1. Such a planetary gear apparatus includes a housing in which constituting members such as a sun gear, an internal gear, and a carrier are housed.

The housing includes an attaching portion that has an annular shape. The attaching portion is fixed to the motor by means of, for example, fastening parts such as bolts.

CITATION LIST

Patent Literature

PTL 1
  Japanese Examined Patent Application Publication No. H6-74835

SUMMARY OF INVENTION

Technical Problem

In the planetary gear apparatus disclosed in PTL 1, when used, an end surface that is one of two end surfaces of planetary gears in an axial direction and is located closer to the motor is in sliding contact with an end surface of the attaching portion of the housing. An end surface that is the other of the two end surfaces of the planetary gears in the axial direction and is located farther from the motor is in sliding contact with a part of the carrier. That is, the rotation of the planetary gears is guided by the attaching portion of the housing and by the carrier.

An object of the present invention is to provide a planetary gear apparatus and an actuator having a novel structure for guiding the rotation of planetary gears when used.

Solution to Problem

A planetary gear apparatus according to one aspect of the present disclosure includes: a plurality of planetary gears each of which includes a planetary teeth portion on an outer circumferential surface; and an internal gear that is provided in such a way as to surround the plurality of planetary gears and includes an internal teeth portion on an inner circumferential surface, the internal teeth portion being in mesh with the planetary teeth portion, in which the internal gear includes a sliding contact portion that is in sliding contact with one of end surfaces of the planetary gear in an axial direction.

An actuator according to one aspect of the present disclosure includes: the planetary gear apparatus with the configuration described above and a motor that is connected to the planetary gear apparatus and drives the planetary gear apparatus.

Advantageous Effects of Invention

The present invention makes it possible to provide a planetary gear apparatus and an actuator having a novel structure for guiding the rotation of planetary gears when used.

DESCRIPTION OF EMBODIMENTS

Based on the drawings, an embodiment of the present invention will now be described in detail.

Figure 1:
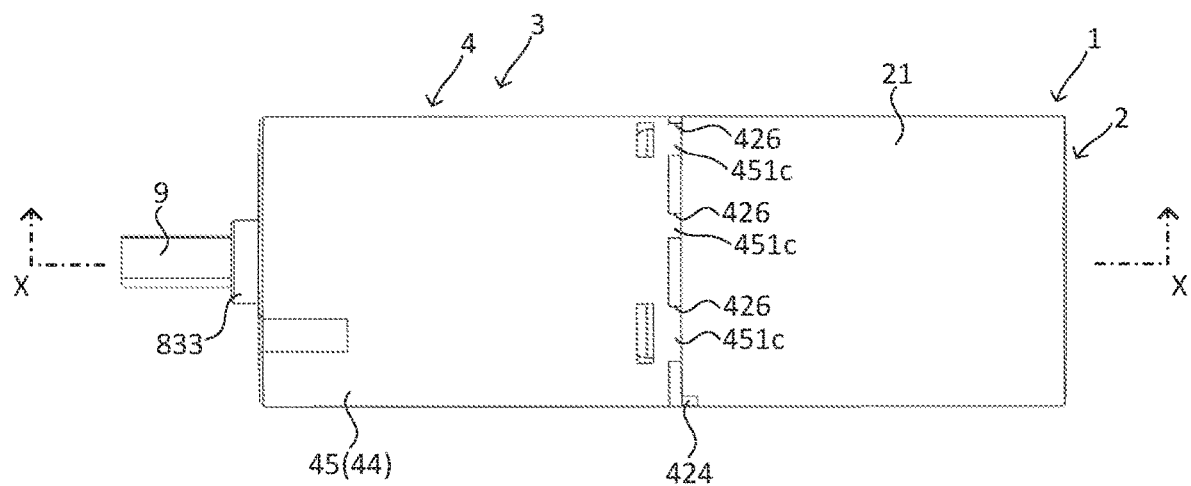
FIG. 1 is a side view of an actuator according to an embodiment of the present invention.
Figure 2:
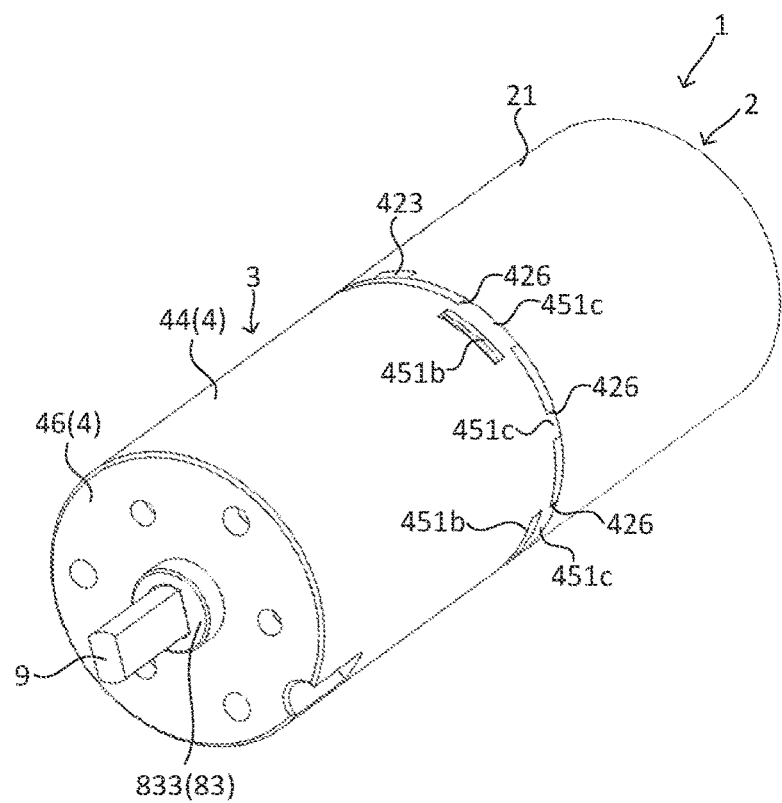
FIG. 2 is a perspective view of the actuator.
Figure 3:
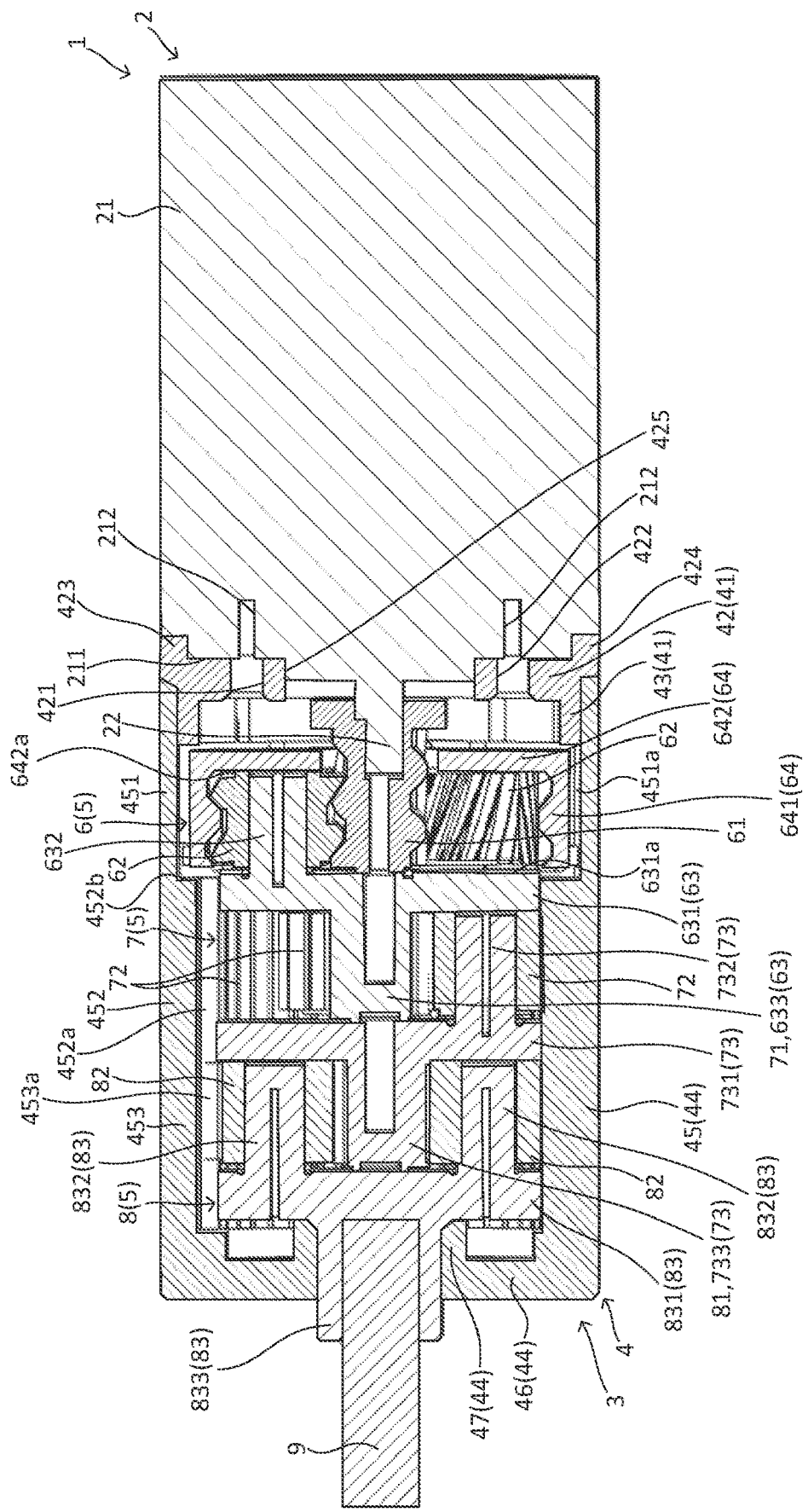
FIG. 3 is a cross-sectional view taken along the line X-X of FIG. 1.
Figure 4:
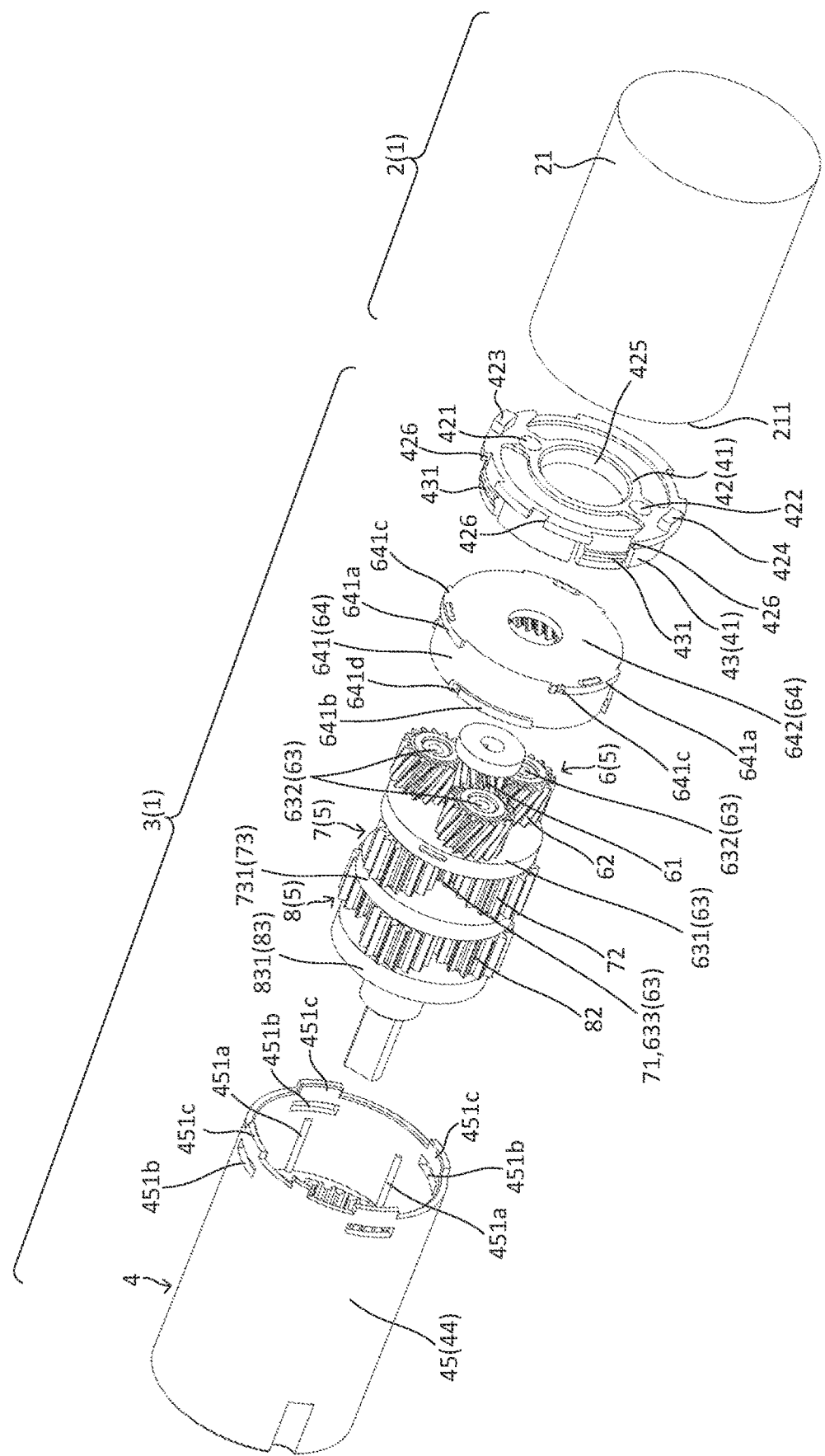
FIG. 4 is an exploded perspective view of the actuator.

[Embodiment] FIG. 1 is a side view of an actuator according to an embodiment of the present invention. FIG. 2 is a perspective view of the actuator. FIG. 3 is a cross-sectional view of the actuator. FIG. 4 is an exploded perspective view of the actuator.

A planetary gear apparatus and an actuator according to the present embodiment is an example of a planetary gear apparatus and an actuator according to the present invention, and the present invention shall not be construed to be limited by the embodiment described below.

In the description below, the horizontal direction in FIGS. 1 and 3 will be referred to as axial direction. The right side in FIGS. 1 and 3 will be referred to as one side in the axial direction, and the left side will be referred to as opposite side in the axial direction. The axial direction, unless explicitly stated otherwise, means the axial direction of the actuator, and of each of members that constitute the actuator.

The direction orthogonal to the axial direction in FIGS. 1 to 3 will be referred to as radial direction. The radial direction, unless explicitly stated otherwise, means the radial direction of the actuator, and of each of members that constitute the actuator. "Outward in the radial direction" means a direction of going radially away from the center of the actuator, and of each of members that constitute the actuator. "Inward in the radial direction" means a direction of coming radially closer to the center of the actuator, and of each of members that constitute the actuator.

In FIGS. 1 to 3, the direction encircling the central axis of the actuator parallel to the axial direction will be referred to as circumferential direction. The circumferential direction, unless explicitly stated otherwise, means the circumferential direction of the actuator, and of each of members that constitute the actuator.

With reference to FIGS. 1 to 4, actuator 1 according to the present embodiment will now be described.

Actuator

Actuator 1 is used as, for example, an actuator for a motorized curtain. However, the use of actuator 1 is not specifically limited.

Actuator 1 includes motor (electric motor) 2 and planetary gear apparatus 3 connected to motor 2.

Motor

Motor 2 includes motor body 21 and rotating shaft 22. Motor 2 operates under the control of a control section (not illustrated), and rotates rotating shaft 22 to drive planetary gear apparatus 3.

Motor body 21 has, on its end surface on the opposite side in the axial direction (the left end surface in FIGS. 1 to 3), supporting surface 211 for supporting planetary gear apparatus 3. Motor body 21 has a plurality of (in the present embodiment, two) motor-side fixing holes 212 in its supporting surface 211.

Motor-side fixing holes 212 are, for example, screw holes, and are provided in supporting surface 211 in an equidistant manner in the circumferential direction (at intervals of 180°). Fastening parts (not illustrated) such as bolts for fixing planetary gear apparatus 3 to motor 2 are threadably driven into motor-side fixing holes 212. That is, motor 2 serves also as a member for supporting planetary gear apparatus 3 described below. The type of the motor is not specifically limited. Various kinds of electric motor known in the art can be used.

Planetary Gear Apparatus

Planetary gear apparatus 3 reduces a speed of rotation inputted from motor 2 at a predetermined reduction ratio and outputs speed-reduced rotation from output shaft 9.

Planetary gear apparatus 3 includes housing 4 and planetary gear mechanism 5 housed in housing 4.

Housing

Housing 4 has mainly a function of housing planetary gear mechanism 5 and a function of fixing planetary gear apparatus 3 to motor 2. Specifically, housing 4 includes connection lid member 41 and housing body 44.

Connection Lid Member

Connection lid member 41 is a member for attaching planetary gear apparatus 3 to motor 2. Connection lid member 41, together with housing body 44, forms a housing space in which planetary gear mechanism 5 is housed.

Connection lid member 41 includes fixing portion 42 having an annular shape and connecting cylindrical portion 43 having a cylindrical shape. Connection lid member 41 is, for example, made of synthetic resin and is integrally molded using injection molding.

Fixing portion 42 is a portion configured to be fixed to supporting surface 211 of motor body 21. Fixing portion 42 has a plurality of (in the present embodiment, two) planet-side fixing holes 421 and 422. Planet-side fixing holes 421 and 422 are through holes going through fixing portion 42 in the axial direction.

Planet-side fixing holes 421 and 422 are provided in fixing portion 42 at positions corresponding to motor-side fixing holes 212 of motor body 21.

Fixing portion 42 has, on its side surface on the one side in the axial direction, a plurality of (in the present embodiment, two) engagement portions 423 and 424 protruding from this side surface toward the one side in the axial direction. Engagement portions 423 and 424 are in engagement with motor body 21 in the circumferential direction. Due to this engagement, the rotation of connection lid member 41 in relation to motor body 21 is restricted.

Fixing portion 42 has through hole 425 for insertion of rotating shaft 22 of motor 2 at its center.

Fixing portion 42 has engagement recesses 426 at a plurality of positions in its outer end portion in the radial direction.

Connecting cylindrical portion 43 has a cylindrical shape. The end of connecting cylindrical portion 43 on the one side in the axial direction (the right end in FIGS. 1 to 3) is connected to fixing portion 42.

Connecting cylindrical portion 43 has, on its outer circumferential surface, a plurality of (in the present embodiment, four) engagement hook portions 431 for engagement with one end portion in the axial direction of housing body 44 to be described below. Connecting cylindrical portion 43 is connected to housing body 44 by means of engagement hook portions 431.

Housing Body

The end portion of housing body 44 on the one side in the axial direction, to which connection lid member 41 is attached, is open.

Housing body 44 has cylindrical portion 45, annular portion 46, and supporting cylindrical portion 47.

Cylindrical portion 45 has a shape of a circular cylinder and houses planetary gear mechanism 5 inside. Specifically, cylindrical portion 45 has first cylindrical portion 451, second cylindrical portion 452, and third cylindrical portion 453 in this order as viewed from the one side in the axial direction (the right side in FIGS. 1 to 3). Cylindrical portion 45 having this structure is, for example, made of synthetic resin and is integrally molded using injection molding.

First cylindrical portion 451 is a portion inside which first planetary gear mechanism 6 to be described later is housed. First cylindrical portion 451 has, in its end portion on the one side in the axial direction (hereinafter referred to as first end portion of first cylindrical portion 451), a plurality of (in the present embodiment, four) engagement holes 451*b* extending in the circumferential direction.

In addition, first cylindrical portion 451 has, at a plurality of positions in the circumferential direction in its first end portion, engagement protrusions 451*c* going in the axial direction.

The first end portion of first cylindrical portion 451 is externally fitted on connecting cylindrical portion 43 of connection lid member 41. In this state, engagement holes 451*b* are in engagement with engagement hook portions 431 of connection lid member 41 in the axial direction and the circumferential direction. Moreover, engagement protrusions 451*c* are in engagement with engagement recesses 426 of fixing portion 42 included in connection lid member 41 in the circumferential direction.

Due to the engagement of engagement holes 451*b* with engagement hook portions 431, the movement of housing body 44 is in relation to connecting cylindrical portion 43 in the axial direction and the circumferential direction is restricted. Moreover, due to the engagement of engagement protrusions 451*c* with engagement recesses 426, the movement of housing body 44 in relation to connecting cylindrical portion 43 in the circumferential direction is restricted.

First cylindrical portion 451 has, at positions on its inner circumferential surface facing an outer circumferential surface of first internal gear 64 to be described later in the radial direction, a plurality of (in the present embodiment, four) ridges 451*a* extending in the axial direction.

Ridges 451*a* are in engagement with first groove portions 641*c* and second groove portions 641*d* of first internal gear 64 to be described later in the circumferential direction. There is a slight gap in the radial direction between the inner circumferential surface of first cylindrical portion 451 and the outer circumferential surface of first internal gear 64.

Ridges 451*a* are either in point contact with or in line contact with first groove portions 641*c* and second groove portions 641*d*, and, by this means, first cylindrical portion 451 supports first internal gear 64 movably in such a manner that the axial line of first internal gear 64 is inclined slightly with respect to the central axis of first cylindrical portion 451 (housing 4).

Second cylindrical portion 452 is a portion inside which second planetary gear mechanism 7 to be described later is housed. The end portion of second cylindrical portion 452 on the one side in the axial direction (hereinafter referred to as first end portion of second cylindrical portion 452) is connected to the end portion of first cylindrical portion 451 on the opposite side in the axial direction (hereinafter referred to as second end portion of first cylindrical portion 451).

Second cylindrical portion 452 includes, on its inner circumferential surface, second internal gear portion 452a having a plurality of teeth extending in the axial direction. Second internal gear portion 452a has spur teeth and is in mesh with second planetary gear 72 of second planetary gear mechanism 7 to be described later. Second internal gear portion 452a may be a helical gear.

Second cylindrical portion 452 may be regarded as an internal gear of second planetary gear mechanism 7. The internal gear of second planetary gear mechanism 7 may be a member separated from housing 4. In this case, the second internal gear portion is provided on an inner circumferential surface of the internal gear provided separately from housing 4.

Then, the internal gear is fixed (internally fitted) to housing 4. The internal gear may be floating-supported by housing 4, similarly to first internal gear 64 of first planetary gear mechanism 6 to be described later.

The internal diameter of second cylindrical portion 452 is less than the internal diameter of first cylindrical portion 451. Therefore, a stepped portion 452b exists at a connection portion of second cylindrical portion 452 and first cylindrical portion 451 (that is, the end surface of second cylindrical portion 452 on the one side in the axial direction).

Stepped portion 452b faces with, in the axial direction, the end portion of first internal gear 64 on the opposite side in the axial direction (hereinafter referred to as second end portion of first internal gear 64) to be described later. Stepped portion 452b is a portion for restricting, to a predetermined amount, the movement of first internal gear 64 toward the opposite side in the axial direction.

Third cylindrical portion 453 includes, on its inner circumferential surface, third internal gear portion 453a having a plurality of teeth (third internal teeth portion) extending in the axial direction. The teeth portion of third internal gear portion 453a has spur teeth and is in mesh with third planetary gear 82 of third planetary gear mechanism 8 to be described later. The pitch and phase of the teeth portion of third internal gear portion 453a is the same as the pitch and phase of the teeth portion of second internal gear portion 452a. Third internal gear portion 453a may be a helical gear.

Third cylindrical portion 453 may be regarded as an internal gear of third planetary gear mechanism 8. The internal gear of third planetary gear mechanism 8 may be a member separated from housing 4. In this case, the third internal gear portion is provided on an inner circumferential surface of the internal gear provided separately from housing 4.

Then, the internal gear is fixed (internally fitted) to housing 4. The internal gear may be floating-supported by housing 4, similarly to first internal gear 64 of first planetary gear mechanism 6 to be described later.

Annular portion 46 has an annular shape and is connected to the end portion of housing body 44 on the opposite side in the axial direction. Specifically, the outer end portion of annular portion 46 in the radial direction is connected to the end portion of third cylindrical portion 453 on the opposite side in the axial direction.

Supporting cylindrical portion 47 has a cylindrical shape and is connected to the inner end portion of annular portion 46 in the radial direction. Supporting cylindrical portion 47 extends from the inner end portion of annular portion 46 in the radial direction toward the one side in the axial direction. Supporting cylindrical portion 47 rotatably supports third outputting shaft 833 of third carrier 83 included in third planetary gear mechanism 8 to be described later.

The end portion of supporting cylindrical portion 47 on the one side in the axial direction (hereinafter referred to as first end portion of supporting cylindrical portion 47) faces with, in the axial direction, third base portion 831 of third carrier 83 included in third planetary gear mechanism 8 to be described later. Supporting cylindrical portion 47 restricts, to a predetermined amount, the movement of third carrier 83 toward the opposite side in the axial direction.

Housing 4 having the structure described above is fixed to motor 2, with connection lid member 41 disposed therebetween, in a state in which planetary gear mechanism 5 to be described below is housed in it.

Planetary Gear Mechanism

Planetary gear mechanism 5 is housed in housing 4 and reduces a speed of rotation transmitted from motor 2 and outputs speed-reduced rotation from output shaft 9.

Planetary gear mechanism 5 includes first planetary gear mechanism 6, second planetary gear mechanism 7, and third planetary gear mechanism 8 in this order as viewed from the one side in the axial direction.

First Planetary Gear Mechanism

First planetary gear mechanism 6 reduces a speed of rotation of rotating shaft 22 of motor 2 at a predetermined reduction ratio and transmits speed-reduced rotation to second planetary gear mechanism 7. In the housing space of housing 4, first planetary gear mechanism 6 is disposed at a position corresponding to first cylindrical portion 451.

First planetary gear mechanism 6 includes first sun gear 61, a plurality of first planetary gears 62, first carrier 63, and first internal gear 64.

First Sun Gear

First sun gear 61 is an external gear and is fixed to rotating shaft 22 of motor 2. Specifically, first sun gear 61 has a first sun teeth portion on its outer circumferential surface. The first sun teeth portion has spiral teeth threaded obliquely with respect to the central axis of first sun gear 61 (the central axis that is identical to the central axis of rotating shaft 22 of motor 2).

That is, first sun gear 61 is a helical gear and is an external gear. The material of first sun gear 61 is, for example, metal or synthetic resin. First sun gear 61 may have teeth parallel to the central axis of first sun gear 61. That is, first sun gear 61 may be a spur gear and be an external gear.

First sun gear 61 can be regarded as a component of the planetary gear mechanism or as a component of the motor. If first sun gear 61 is regarded as a component of motor 2, the concept of the planetary gear mechanism does not include the first sun gear.

First Planetary Gear

First planetary gears 62, each of which is an external gear, are provided at equal intervals in the circumferential direction in a space between first sun gear 61 and first internal gear 64. First planetary gears 62 are rotatably supported respectively by first planetary shafts 632 of first carrier 63 to be described later.

Specifically, each of first planetary gears 62 has a first planetary teeth portion on its outer circumferential surface. The first planetary teeth portion has spiral teeth threaded obliquely with respect to the central axis of first planetary gear 62. That is, each of first planetary gears 62 is a helical gear and is an external gear.

Each of first planetary gears 62 may have teeth parallel to the central axis of first planetary gear 62. That is, first planetary gear 62 may be a spur gear and be an external gear.

The first planetary teeth portion of first planetary gear 62 is in mesh with the first sun teeth portion of first sun gear 61 and with a first internal teeth portion of first internal gear 64 to be described later.

Based on the rotation of first sun gear 61, each of first planetary gears 62 rotates on its own central axis. In addition, based on its own rotation and its meshing with first internal gear 64, each of first planetary gears 62 orbits around first sun gear 61. The central axis of orbital motion of first planetary gear 62 is the same as the central axis of first sun gear 61.

The end surface of first planetary gear 62 on the one side in the axial direction (hereinafter referred to as first end surface of first planetary gear 62) faces with, in the axial direction, ring-side sliding contact surface 642*a* of guide portion 642 included in first internal gear 64 to be described later. When in a state of use, the first end surface of first planetary gear 62 is in sliding contact with ring-side sliding contact surface 642*a*.

The end surface of first planetary gear 62 on the opposite side in the axial direction (hereinafter referred to as second end surface of first planetary gear 62) faces with, in the axial direction, carrier-side sliding contact surface 631*a* of first base portion 631 included in first carrier 63 to be described below. When in a state of use, the second end surface of first planetary gear 62 is in sliding contact with carrier-side sliding contact surface 631*a*.

The material of first planetary gear 62 described above is, for example, metal or synthetic resin.

First Carrier

First carrier 63 supports first planetary gears 62 rotatably (such that they can rotate on their axes). Based on the orbital motion of first planetary gears 62, first carrier 63 rotates, and transmits its rotation to second planetary gear mechanism 7.

First carrier 63 includes first base portion 631, a plurality of first planetary shafts 632, and first output shaft 633. First carrier 63 is, for example, made of synthetic resin and is integrally molded using injection molding.

First base portion 631 has a shape like a disc. First base portion 631 has an external diameter that is slightly less than the internal diameter of second cylindrical portion 452 of housing body 44. In the housing space of housing 4, first base portion 631 is disposed at a position corresponding to the end portion of second cylindrical portion 452 on the one side in the axial direction.

First base portion 631 has carrier-side sliding contact surface 631*a* on its end surface on the one side in the axial direction (hereinafter referred to as first end surface of first base portion 631). Carrier-side sliding contact surface 631*a* faces with the second end surface of first planetary gear 62 in the axial direction.

When in a state of use, carrier-side sliding contact surface 631*a* can be in sliding contact with the second end surface of first planetary gear 62. Based on sliding contact with the second end surface of first planetary gear 62, carrier-side sliding contact surface 631*a* guides the rotation of first planetary gear 62, and restricts, to a predetermined amount, the movement of first planetary gear 62 toward the opposite side in the axial direction.

Each of the plurality of (in the present embodiment, three) first planetary shafts 632 is provided at an equidistant position from the others in the circumferential direction on the first end surface of first base portion 631. Each of first planetary shafts 632 extends from the first end surface of first base portion 631 toward the one side in the axial direction.

The end portion of first planetary shaft 632 on the one side in the axial direction (hereinafter referred to as first end portion of first planetary shaft 632) is a free end that is not fixed to any other member. On the other hand, the end portion of first planetary shaft 632 on the opposite side in the axial direction (hereinafter referred to as second end portion of first planetary shaft 632) is connected to the first end surface of first base portion 631. That is, each of first planetary shafts 632 is cantilever-supported by first base portion 631.

Each of first planetary shafts 632 supports first planetary gear 62 rotatably in a state of being inserted through first planetary gear 62.

First planetary shaft 632 does not particularly restrict the movement of first planetary gear 62 in the axial direction. That is, first planetary gear 62 is movable in the axial direction in relation to first planetary shaft 632. However, the movement of first planetary gear 62 in the axial direction is restricted to a predetermined amount by first base portion 631 and by guide portion 642 included in first internal gear 64 to be described below.

First output shaft 633 is an external gear and is fixed to the end surface of first base portion 631 on the opposite side in the axial direction (hereinafter referred to as second end surface of first base portion 631). First output shaft 633 serves also as second sun gear 71 of second planetary gear mechanism 7 to be described later. First output shaft 633 transmits the rotation of first carrier 63 to second planetary gear mechanism 7.

First Internal Gear

First internal gear 64 is disposed around first planetary gears 62 and is in mesh with first planetary gears 62. First internal gear 64 includes ring-side sliding contact surface 642*a* that is in sliding contact with the first end surface of first planetary gears 62 when in a state of use.

First internal gear 64 having this structure has a function of guiding the rotation of first planetary gears 62 while restricting the movement of first planetary gears 62 toward the one side in the axial direction, based on sliding contact with the first end surface of first planetary gears 62.

Specifically, first internal gear 64 includes cylindrical portion 641 and guide portion 642.

Cylindrical portion 641 has a shape of a circular cylinder and includes a first internal teeth portion on its inner circumferential surface. The first internal teeth portion has spiral teeth threaded obliquely with respect to the central axis of cylindrical portion 641 (the central axis that is identical to the central axis of rotating shaft 22 of motor 2). Cylindrical portion 641 having this structure is a helical gear and is an internal gear.

In the housing space of housing 4, cylindrical portion 641 is disposed around first planetary gears 62 inside first cylindrical portion 451 of housing body 44. In this state, there is a slight gap in the radial direction between the outer circumferential surface of cylindrical portion 641 and the inner circumferential surface of first cylindrical portion 451. The first internal teeth portion of cylindrical portion 641 is in mesh with the first planetary teeth portion of first planetary gears 62.

The first internal teeth portion may have teeth parallel to the central axis of cylindrical portion 641. That is, the gear of cylindrical portion 641 may be a spur gear and be an internal gear.

Cylindrical portion 641 has a plurality of (in the present embodiment, three) first ridges 641a and a plurality of (in the present embodiment, three) second ridges 641b on its outer circumferential surface.

Each of first ridge 641a and second ridge 641b extends in the circumferential direction. On the outer circumferential surface of cylindrical portion 641, first ridges 641a are provided at an end on the one side in the axial direction. On the outer circumferential surface of cylindrical portion 641, second ridges 641b are provided at an end on the opposite side in the axial direction.

The positions of first ridges 641a in the circumferential direction are not in phase with the positions of second ridges 641b in the circumferential direction. In other words, first ridges 641a and second ridges 641b are provided alternately in the circumferential direction.

Cylindrical portion 641 has first groove portion 641c in a part of first ridge 641a. First groove portion 641c is formed from a side of first ridge 641a on the one side in the axial direction to a side thereof on the opposite side in the axial direction.

Cylindrical portion 641 has second groove portion 641d in a part of second ridge 641b. Second groove portion 641d is formed from a side of second ridge 641b on the one side in the axial direction to a side thereof on the opposite side in the axial direction.

Each of first groove portion 641c and second groove portion 641d is in engagement with ridge 451a of first cylindrical portion 451 in the circumferential direction. The rotation of first internal gear 64 in relation to housing 4 is restricted by the engagement of first groove portion 641c and second groove portion 641d with ridge 451a.

First groove portion 641c and second groove portion 641d are either in point contact with or in line contact with ridge 451a.

As described above, cylindrical portion 641 is floating-supported in relation to first cylindrical portion 451 (housing 4). In other words, cylindrical portion 641 is supported in a state in which it can be inclined slightly and be moved slightly in the axial direction in relation to first cylindrical portion 451 (housing 4).

The end portion of cylindrical portion 641 on the one side in the axial direction (hereinafter referred to as first end portion of cylindrical portion 641) faces with, in the axial direction, connecting cylindrical portion 43 of connection lid member 41 included in housing 4, with a slight gap existing therebetween. Therefore, the movement of cylindrical portion 641 toward the one side in the axial direction is restricted to a predetermined amount by connection lid member 41.

The end portion of cylindrical portion 641 on the opposite side in the axial direction (hereinafter referred to as second end portion of cylindrical portion 641) faces with, in the axial direction, stepped portion 452b of second cylindrical portion 452 included in housing 4, with a predetermined gap in the axial direction existing therebetween. Therefore, the movement of cylindrical portion 641 toward the opposite side in the axial direction is restricted to a predetermined amount by stepped portion 452b.

Cylindrical portion 641 may be fixed in a state of not being movable in relation to first cylindrical portion 451 (housing 4). Cylindrical portion 641 may be made of first cylindrical portion 451 (housing 4). In this case, the first internal teeth portion is provided on the inner circumferential surface of first cylindrical portion 451 (housing 4).

Guide portion 642 corresponds to an example of a sliding contact portion and has an annular shape. Guide portion 642 is provided on the first end portion of cylindrical portion 641. Guide portion 642 extends radially inward from the first end portion of cylindrical portion 641.

Guide portion 642 is disposed between connection lid member 41 and first planetary gears 62 in the axial direction. Guide portion 642 has ring-side sliding contact surface 642a at its surface on the opposite side in the axial direction.

Ring-side sliding contact surface 642a is an annular plane that is flat throughout its entire round. That is, no through hole, groove, or the like is formed in ring-side sliding contact surface 642a. Ring-side sliding contact surface 642a faces with the first end surface of first planetary gears 62 in the axial direction. When in a state of use, ring-side sliding contact surface 642a can be in sliding contact with the first end surface of first planetary gears 62.

Ring-side sliding contact surface 642a having this structure has a function of guiding the rotation of first planetary gears 62 while restricting, to a predetermined amount, the movement of first planetary gears 62 toward the one side in the axial direction when in a state of use.

Second Planetary Gear Mechanism

Second planetary gear mechanism 7 reduces a speed of rotation transmitted from first planetary gear mechanism 6 at a predetermined reduction ratio and outputs speed-reduced rotation. Second planetary gear mechanism 7 is provided relatively on the opposite side in the axial direction (the left side in FIGS. 1 to 3) with respect to first planetary gear mechanism 6.

In the housing space of housing 4, second planetary gear mechanism 7 is disposed at a position corresponding to second cylindrical portion 452. Second planetary gear mechanism 7 may be omitted. In this case, first output shaft 633 of first carrier 63 is the output shaft of the first planetary gear mechanism.

Second planetary gear mechanism 7 includes second sun gear 71, a plurality of second planetary gears 72, and second carrier 73. The internal gear of second planetary gear mechanism 7 may be taken as second cylindrical portion 452 of housing 4 having already been described.

Second Sun Gear

Second sun gear 71 is first output shaft 633 of first planetary gear mechanism 6 having already been described. Second sun gear 71 is an external gear and is connected to the second end surface of first base portion 631 included in first carrier 63.

Specifically, second sun gear 71 has a second sun teeth portion on its outer circumferential surface. The second sun teeth portion has spur teeth. That is, second sun gear 71 is a spur gear and is an external gear. Second sun gear 71 may be a helical gear.

Second Planetary Gear

Each of second planetary gears 72 has a second planetary teeth portion having spur teeth on its outer circumferential surface. Each of second planetary gears 72 is a spur gear and is an external gear. Each of second planetary gears 72 is provided at an equal distance from the others in a space between second sun gear 71 and second cylindrical portion 452 of housing 4. Second planetary gear 72 may be a helical gear.

Each of second planetary gears 72 is supported rotatably on second planetary shaft 732 of second carrier 73.

The second planetary teeth portion of second planetary gear 72 is in mesh with the second sun teeth portion of second sun gear 71 and with second internal gear portion 452a of second cylindrical portion 452.

Based on the rotation of second sun gear 71, each of second planetary gears 72 rotates on its own central axis. In addition, each of second planetary gears 72 orbits around second sun gear 71, based on the meshing of second planetary gear 72 with second internal gear portion 452a of second cylindrical portion 452 in addition to its own rotation. The central axis of orbital motion of second planetary gear 72 is the same as the central axis of second sun gear 71.

When in a state of use, the end surface of second planetary gear 72 on the one side in the axial direction (hereinafter referred to as first end surface of second planetary gear 72) is in sliding contact with the end surface of first base portion 631 included in first carrier 63 on the opposite side in the axial direction.

On the other hand, when in a state of use, the end surface of second planetary gear 72 on the opposite side in the axial direction (hereinafter referred to as second end surface of second planetary gear 72) is in sliding contact with the end surface of second base portion 731 included in second carrier 73 to be described below on the one side in the axial direction.

The material of second planetary gear 72 is, for example, metal or synthetic resin.

Second Carrier

Second carrier 73 supports second planetary gears 72 rotatably (such that they can rotate on their axes). In addition, based on the orbital motion of second planetary gears 72, second carrier 73 rotates, and transmits its rotation to third planetary gear mechanism 8.

Second carrier 73 includes second base portion 731, a plurality of second planetary shafts 732, and second output shaft 733.

The structure of second carrier 73 described above is almost the same as the structure of first carrier 63. Therefore, with regard to the structure of second base portion 731, second planetary shafts 732, and second output shaft 733, reading the foregoing description of first base portion 631, first planetary shafts 632, and first output shaft 633 while replacing the terms therewith will suffice.

Third Planetary Gear Mechanism

Third planetary gear mechanism 8 reduces a speed of rotation transmitted from second planetary gear mechanism 7 at a predetermined reduction ratio and outputs speed-reduced rotation. Third planetary gear mechanism 8 is provided relatively on the opposite side in the axial direction (the left side in FIGS. 1 to 3) with respect to second planetary gear mechanism 7.

In the housing space of housing 4, third planetary gear mechanism 8 is disposed at a position corresponding to third cylindrical portion 453. Third planetary gear mechanism 8 may be omitted. In this case, first output shaft 633 of first carrier 63 or second output shaft 733 of second carrier 73 is the output shaft of the first planetary gear mechanism.

Third planetary gear mechanism 8 includes third sun gear 81, a plurality of third planetary gears 82, and third carrier 83. The internal gear of third planetary gear mechanism 8 may be taken as third cylindrical portion 453 of housing 4 having already been described.

Third Sun Gear

Third sun gear 81 is second output shaft 733 of second planetary gear mechanism 7 having already been described. Third sun gear 81 is an external gear and is connected to the end surface of second base portion 731 included in second carrier 73 on the opposite side in the axial direction (hereinafter referred to as second end surface of second base portion 731).

Specifically, third sun gear 81 has a third sun teeth portion on its outer circumferential surface. The third sun teeth portion has spur teeth. That is, third sun gear 81 is a spur gear and is an external gear. Third sun gear 81 may be a helical gear.

Third Planetary Gear

Each of third planetary gears 82 has a third planetary teeth portion having spur teeth on its outer circumferential surface. Each of third planetary gears 82 is a spur gear and is an external gear. Each of third planetary gears 82 is provided at an equal distance from the others in a space between third sun gear 81 and third cylindrical portion 453 of housing 4. Third planetary gear 82 may be a helical gear.

Each of third planetary gears 82 is supported rotatably on third planetary shaft 832 of third carrier 83.

The third planetary teeth portion of third planetary gear 82 is in mesh with the third sun teeth portion of third sun gear 81 and with third internal gear portion 453a of third cylindrical portion 453.

Based on the rotation of third sun gear 81, each of third planetary gears 82 rotates on its own central axis. In addition, each of third planetary gears 82 orbits around third sun gear 81, based on the meshing of third planetary gear 82 with third internal gear portion 453a of third cylindrical portion 453 in addition to its own rotation. The central axis of orbital motion of third planetary gear 82 is the same as the central axis of third sun gear 81.

When in a state of use, the end surface of third planetary gear 82 on the one side in the axial direction (hereinafter referred to as first end surface of third planetary gear 82) is in sliding contact with the end surface of second base portion 731 included in second carrier 73 on the opposite side in the axial direction.

On the other hand, when in a state of use, the end surface of third planetary gear 82 on the opposite side in the axial direction (hereinafter referred to as second end surface of third planetary gear 82) is in sliding contact with the end surface of third base portion 831 included in third carrier 83 to be described below on the one side in the axial direction.

The material of third planetary gear 82 is, for example, metal or synthetic resin.

Third Carrier

Third carrier 83 supports third planetary gears 82 rotatably (such that they can rotate on their axes). In addition, based on the orbital motion of third planetary gears 82, third carrier 83 rotates, and outputs its rotation.

Third carrier 83 includes third base portion 831, a plurality of third planetary shafts 832, and a third output shaft.

The structure of third base portion 831 and third planetary shafts 832 of third carrier 83 described above is the same as the structure of first base portion 631 and first planetary shafts 632 of first carrier 63. Therefore, with regard to the structure of third base portion 831 and third planetary shafts 832, reading the foregoing description of first base portion 631 and first planetary shafts 632 while replacing the terms therewith will suffice.

The end portion of third outputting shaft 833 on the one side in the axial direction is fixed to the end surface of third base portion 831 on the opposite side in the axial direction (hereinafter referred to as second end surface of third base portion 831). Third outputting shaft 833 is inserted through supporting cylindrical portion 47 of housing body 44.

The end portion of third outputting shaft 833 on the opposite side in the axial direction protrudes in the axial direction from the end surface of housing 4 on the opposite side in the axial direction. Output shaft 9 is fixed to third outputting shaft 833.

Operation of Actuator, and Operational Effects Thereof

The operation of actuator 1, and operational effects thereof, will now be described. First, upon activation of motor 2, rotating shaft 22 rotates in a first direction or a second direction. Described below is a case where rotating shaft 22 rotates in the first direction.

In the description below, the first direction regarding the direction of rotation of each member means a clockwise direction when each member is viewed from the one side in the axial direction (the right side in FIGS. 1 to 3). In the description below, the second direction regarding the direction of rotation of each member means a counterclockwise direction when each member is viewed from the one side in the axial direction (the right side in FIGS. 1 to 3).

When rotating shaft 22 rotates in the first direction, first sun gear 61 rotates in the first direction together with rotating shaft 22. Next, based on the rotation of first sun gear 61, each of first planetary gears 62 rotates on its own central axis (first planetary shaft 632) in the second direction (own-axis rotation).

Moreover, based on the own-axis rotation of first planetary gear 62, and based on the meshing of first planetary gear 62 with first internal gear 64, first planetary gear 62 revolves around the central axis of rotation of first sun gear 61 in the first direction (orbital motion).

In this process, since the first planetary teeth portion is a helical gear, a load in the axial direction according to the direction of inclination of the first planetary teeth portion (a thrust load) acts on first planetary gear 62. Such a thrust load causes first planetary gear 62 to move in the axial direction.

For example, in a case where first planetary gear 62 moves toward the one side in the axial direction (the right side in FIGS. 1 to 3) on the basis of the thrust load mentioned above, the first end surface of first planetary gear 62 comes into sliding contact with ring-side sliding contact surface 642a of guide portion 642 included in first internal gear 64.

Therefore, the rotation of first planetary gear 62 is guided by ring-side sliding contact surface 642a while a change in position of first planetary gear 62 toward the one side in the axial direction is restricted.

In the present embodiment, since ring-side sliding contact surface 642a is an annular plane that is flat throughout its entire round, first planetary gear 62 and ring-side sliding contact surface 642a are in sliding contact with each other smoothly. Therefore, first planetary gear 62 is capable of rotating stably.

If first internal gear 64 were not provided with guide portion 642 (ring-side sliding contact surface 642a), the first end surface of first planetary gear 62 would be in sliding contact with the end surface of fixing portion 42 included in connection lid member 41 on the opposite side in the axial direction. However, opening of planet-side fixing hole 421, 422 exists in the end surface of fixing portion 42 on the opposite side in the axial direction.

For this reason, there is a problem of an undesirable external force acting on the rotation of first planetary gear 62 due to the contact of the first end surface of first planetary gear 62 with the edge of the opening of planet-side fixing hole 421, 422. Such an external force might make the rotation of first planetary gear 62 unstable or damage first planetary gear 62.

In order to solve these problems, it is conceivable to provide an annular washer between the first end surface of first planetary gear 62 and fixing portion 42 of connection lid member 41. However, if this structure is adopted, the number of parts increases and, therefore, assembly work might require more effort, and the cost of manufacturing might increase. Moreover, a problem of forgetting to insert the washer could happen when doing assembly work.

By contrast, in the present embodiment, since first internal gear 64 is provided with guide portion 642 (ring-side sliding contact surface 642a), all of the problems described above can be solved. The description of the operation of actuator 1 is continued below. Even when first planetary gear 62 is a spur gear, operational effects similar to those described above can be obtained.

When first planetary gear 62 orbits therearound, first carrier 63 rotates on its own central axis (the central axis that is the same as the central axis of first sun gear 61) in the first direction.

The rotation of first carrier 63 is transmitted to first output shaft 633 (second sun gear 71), and second sun gear 71 rotates in the first direction. The rotation of second sun gear 71 is transmitted via second planetary gear mechanism 7 and third planetary gear mechanism 8 to output shaft 9. The operation of second planetary gear mechanism 7 and third planetary gear mechanism 8 is almost the same as the operation of first planetary gear mechanism 6 and, therefore, it is not described here.

Second planetary gear 72 and second internal gear portion 452a may have spur teeth or helical teeth.

With regard to a gear-type combination of first planetary gear 62 and the first internal teeth portion (first planetary gear 62 and the first internal teeth portion will be collectively referred to as higher-speed-side planet portion) and second planetary gear 72 and second internal gear portion 452a (second planetary gear 72 and second internal gear portion 452a will be collectively referred to as lower-speed-side planet portion), it is preferable if the higher-speed-side planet portion has helical teeth and the lower-speed-side planet portion has spur teeth in terms of a reduction in the cost of manufacturing of the lower-speed-side planet portion.

On the other hand, if the higher-speed-side planet portion has helical teeth and the lower-speed-side planet portion has helical teeth, the meshing rate of the lower-speed-side planet portion improves, which is desirable. The combination of these types can be selected suitably for the purpose and usage.

The same as that for second planetary gear 72 and second internal gear portion 452a holds for third planetary gear 82 and third internal gear portion 453a.

Supplementary Notes

When members that constitute actuator 1 described above are produced using synthetic resin, for example, polyarylate (PAR), polyacetal (POM), polyamide (PA), polycarbonate (PC), polybutylene terephthalate (PBT), polyethersulfone (PES), polyetheretherketone (PEEK), etc. can be used as the synthetic resin.

An embodiment of the present invention has been described above. The foregoing description shows an example of a preferred embodiment of the present invention, and the scope of the present invention is not limited thereto. That is, the foregoing description about the structure of the apparatus and the shape of each portion is just an example, and it is apparent that various modifications and additions to the example can be made within the scope of the present invention.

Moreover, a planetary gear apparatus and an actuator according to the present invention does not necessarily have to include all of members provided in planetary gear apparatus 3 and actuator 1 according to the foregoing embodiment. A planetary gear apparatus and an actuator according to the present invention may be comprised of any one or more members extracted from planetary gear apparatus 3 and actuator 1 according to the foregoing embodiment, unless technically contradictory.

INDUSTRIAL APPLICABILITY

A planetary gear apparatus and an actuator according to the present invention can be built into various mechanical apparatuses, without being limited to a motorized curtain.

REFERENCE SIGNS LIST

1 Actuator
2 Motor
21 Motor body
211 Supporting surface
212 Motor-side fixing hole
22 Rotating shaft
3 Planetary gear apparatus
4 Housing
41 Connection lid member
42 Fixing portion
421, 422 Planet-side fixing hole
423, 424 Engagement portion
425 Through hole
426 Engagement recess
43 Connecting cylindrical portion
431 Engagement hook portion
44 Housing body
45 Cylindrical portion
451 First cylindrical portion
451a Ridge
451b Engagement hole
451c Engagement protrusion
452 Second cylindrical portion
452a Second internal gear portion
452b Stepped portion
453 Third cylindrical portion
453a Third internal gear portion
46 Annular portion
47 Supporting cylindrical portion
5 Planetary gear mechanism
6 First planetary gear mechanism
61 First sun gear
62 First planetary gear
63 First carrier
631 First base portion
631a Carrier-side sliding contact surface
632 First planetary shaft
633 First output shaft
64 First internal gear
641 Cylindrical portion
641a First ridge
641b Second ridge
641c First groove portion
641d Second groove portion
642 Guide portion
642a Ring-side sliding contact surface
7 Second planetary gear mechanism
71 Second sun gear
72 Second planetary gear
73 Second carrier
731 Second base portion
732 Second planetary shaft
733 Second output shaft
8 Third planetary gear mechanism
81 Third sun gear
82 Third planetary gear
83 Third carrier
831 Third base portion
832 Third planetary shaft
833 Third output shaft
9 Output shaft

The invention claimed is:

1. A planetary gear apparatus, comprising:
   a plurality of planetary gears each of which includes a planetary teeth portion on an outer circumferential surface; and
   an internal gear including a cylindrical portion that is provided in such a way as to surround the plurality of planetary gears and includes an internal teeth portion on an inner circumferential surface, the internal teeth portion being in mesh with the planetary teeth portion, wherein
   the internal gear further includes a sliding contact portion formed integrally with the cylindrical portion and having an annular shape extending radially inward from one end portion of the cylindrical portion in an axial direction, the sliding contact portion being configured to be in sliding contact with one of end surfaces of the planetary gear in the axial direction when the planetary gear apparatus is in a state of use.

2. The planetary gear apparatus according to claim 1, wherein
   the sliding contact portion is flat at least throughout an entire area of sliding contact with the one of the end surfaces.

3. The planetary gear apparatus according to claim 1, further comprising:
   a carrier that includes
      a base portion that has an annular shape, and
      a planetary shaft that is cantilever-supported by the base portion and supports the planetary gear rotatably, wherein
   opposite one of the end surfaces of the planetary gear in the axial direction is in sliding contact with an end surface of the base portion.

4. The planetary gear apparatus according to claim 1, wherein
   the sliding contact portion is disposed between an electric motor and the one of the end surfaces in the axial direction.

5. The planetary gear apparatus according to claim 4, further comprising:
   a housing in which the planetary gear and the internal gear are housed, wherein
   the housing is fixed to the electric motor between the electric motor and the sliding contact portion.

6. The planetary gear apparatus according to claim 5, wherein
   the housing includes an inner circumferential surface facing with an outer circumferential surface of the internal gear, with a gap therebetween.

7. An actuator, comprising:
   the planetary gear apparatus according to claim 1; and
   a motor that is connected to the planetary gear apparatus and drives the planetary gear apparatus.

* * * * *